United States Patent Office 3,013,094
Patented Dec. 12, 1961

3,013,094
PROCESS OF PREPARING RUBBER DERIVATIVES WHEREIN LIGNIN IS USED AS AN ACID CARRIER
Thomas Raymond Griffith and John Edward Tyson, Ottawa, Ontario, Canada, assignors to National Research Council, Ottawa, Ontario, Canada, a corporation of Canada
No Drawing. Filed May 17, 1954, Ser. No. 430,405
4 Claims. (Cl. 260—762)

This invention relates to rubber derivatives suitable for use in rubber solvents to form rubber adhesives, particularly rubber to metal adhesives, and to methods of preparing the same.

The adhesive compositions to which the invention is directed are those of the general character to which prior U.S. patents to Thomas Raymond Griffith, Nos. 2,311,656, 2,340,321, and 2,386,213 and the prior U.S. Patent No. 2,379,939 to Vance et al. relate. Such compositions have been produced by milling suitable rubber conversion agents, together with vulcanizing agents, accelerators, and various modifying agents, into a natural or synthetic rubber, sheeting the mixture into thin slabs, and heating it to produce a reaction product of the cyclized rubber type. The reaction product is then mixed with suitable compounding agent and masticated to render it soluble in rubber solvents, in which it is dissolved to form the final liquid adhesive product. In use, the metal is coated with the adhesive, the rubber to be adhered is brought into contact with adhesive coat under pressure, and the assembly is heated to vulcanize the adhesive.

As disclosed in the aforementioned prior patents, the art has struggled with the solution of numerous problems in improving the adhesive product so as to secure uniformity of properties, higher bond strengths at both normal and elevated temperatures without adversely affecting the tensile strength of the bonded rubber, longer shelf-life, and the ability to achieve these results with a single adhesive coat. In addition, various processing operations have imposed serious technical problems. Though much improvement has already been achieved, the improvements in various respects were generally accomplished only at the sacrifice of product or processing advantages in other respects.

The general objects of the invention are to provide a method for making rubber derivatives having uniform adhesive properties, long shelf-life, and improved bonding strength, particularly when employed in a solvent for bonding rubber to metal. A more specific object of the invention is to provide a method for improving the hot strength of rubber to metal adhesives of the general character described above, and to do so without adversely affecting the hot tensile strength of the bonded rubber.

Still another object of the invention is to provide a rubber to metal adhesive having the foregoing improved properties and requiring the application of but a single adhesive coat to the metal surface, without the necessity for employing any so-called "tie coats" or the like, to achieve the desired high strength at both low and high temperatures.

Yet another object of the invention is to provide a method for producing rubber derivatives for rubber to metal adhesives, which method is easier to carry out in production with uniform results.

The present invention is characterized by a number of novel features which, individually and in combination, contribute to the simultaneous accomplishment of all of the foregoing objectives. Among these features is the use of, a weakly acid substance and a strong mineral acid, preferably solid phosphorous pentoxide and a combination of aqueous sulphuric and hydrochloric acids, as cyclizing reagents, the aqueous acids being mixed with lignin prior to milling into the rubber with the solid phosphorous pentoxide previously incorporated therein. Lignin, as referred to in this application and well known in the art, is a product from the soda or sulphate processes in paper manufacture. This product is soluble in alkali, but not acid, and has a high absorptive capacity for water and non-alkaline aqueous solutions. The presence of the hydrochloric acid in combination with the sulphuric acid and the use of lignin as a carrier for the aqueous acids promote uniformity in the product, and the lignin carrier is especially effective in this regard in that it facilitates thorough mixing of the acids into the rubber by reducing spurting and minimizes losses by evaporation.

Another characteristic and important feature of the invention is the control of the temperature of the rolls of the rubber mill within the limits of about 80° to 100° F. so that the temperature of the rubber and reagents is maintained in a range that apparently promotes the proper type and degree of chemical reaction. Though the exact character of the reaction is obscure and the chemical effects of maintaining the proper temperature are not understood, experience accumulated in the course of extensive tests has demonstrated that such temperature control contributes greatly to achieving uniformly high bonding properties.

Still another characteristic and important feature of the invention is the performance of the milling operation in two steps, separated by a time interval of about 6 to 36 hours, preferably about 24 hours. This interruption of the milling operation, like the feature of temperature control described above, contributes in some obscure manner to bringing about the type and degree of reaction which, by long experience, has been found to produce optimum adhesive properties with a high degree of uniformity. Because of the difficulty of obtaining a uniform dispersion of reagents throughout the rubber mass, and because of reactions in the nature of oxidation that occur during the period of milling interruption, the resumption of milling after the interruption and just prior to heating has a valuable homogenizing effect.

Still another feature of the invention is the incorporation into the reaction product of hard rubber dust, having a particle size ranging from about 177 to 500 microns in maximum dimension. The hard rubber dust seems to perform three valuable functions. Firstly, it stiffens the adhesive in the vulcanized bond, rendering it less thermoplastic and therefore stronger at elevated temperatures. Secondly, it serves somehow to render the amount of acid reagent employed less critical, permitting greater variation in the difficult step of incorporating uniform quantities of acid reagent into the rubber and thereby facilitating the production of a uniform final product. Thirdly, it seems to serve as a source of vulcanizing sulfur for the adhesive, apparently supplying the sulphur in such a manner that it has less tendency to migrate into the rubber to be bonded. This reduces the tendency of this rubber to become over-vulcanized, which reduces its hot strength, particularly, and causes rubber failures under stresses well below the bond strength of the adhesive to both the metal and the rubber.

Yet another feature of the invention is the combination of two rubber reaction products of substantially different softening points. This may be done in the masticating process, though it is preferable to make two different cements separately with the two different reaction products and mix the two different cements in the desired proportions.

The softening point of rubber derivatives of the character described above is largely dependent upon the quantity of acid reagent incorporated with the rubber in the first milling operation, and varies directly with the quantity of the reagent, though not according to any simple relationship. It appears that there is a tendency in such mixtures for the soft component to migrate toward the surface of the rubber to be bonded, and of the hard component to migrate toward the surface of the metal to be bonded during the development of the rubber-to-metal bond. Since soft components have superior adherence to rubber and hard components superior adherence to metal, the combination of the two tends to present to the rubber and metal surfaces the particular components that provide maximum adhesion, thereby enhancing the strength of the bond. In addition, it has been found that the combination of rubber derivatives having substantially different softening points contributes to the shelf-life of the final adhesive product by retarding stiffening of the adhesive with age, and extending the time within which it may be stored without setting to a useless gel. While cements comprising such mixtures still increase somewhat in viscosity over prolonged periods of time, they can be thinned down readily, without loss of adhesiveness, by the addition of solvent, provided this is done before the adhesive gels.

The foregoing and other objects, characteristics, and advantages of the invention will be more fully understood by reference to the following illustrative examples of the manufacture of adhesives, in accordance with the invention and of the characteristics of the resulting products.

*Example I*

An acid reagent solution was prepared in accordance with the following recipe:

|  | Parts by wt. |
|---|---|
| Distilled water | 47.5 |
| $H_2SO_4$ (sp. gr. 1.84) | 44.1 |
| HCl (sp. gr. 1.19) | 8.4 |
|  | 100.0 |

To 100 parts of smoked sheet, 2.9 parts of phosphorous pentoxide ($P_2O_5$) and 0.4 part of 2,2′ benzothiazyl disulfide were added on a rubber mill, and the sheet was worked on the mill to obtain thorough dispersion of the added reagents. A mixture of 6.5 parts of the above acid reagent solution and 8.0 parts of lignin was then added to the sheet while continuing to work it on the mill to obtain thorough incorporation and dispersion. By reason of the presence of the lignin, this addition of liquid was quickly accomplished with unusual ease and absence of spurting.

The particular form of lignin employed in this example was the product sold under the trademark "Tomlinite" by Howard Smith Paper Mills of Cornwall, Ontario, Canada. A similar, equivalent lignin product is manufactured in the United States by the West Virginia Pulp & Paper Company, Charleston, South Carolina in the sulfate process of paper making and is sold under the trademark "Indulin."

During the incorporation of the above materials into the smoked sheet, the mill rolls were kept at a temperature in the range of 80° to 100° F. by circulating tap water through the rollers and controlling the water temperature as required, first, to initially heat the rollers slightly and, thereafter, to remove heat generated during the milling operation.

When thorough dispersion of the reagents was accomplished, which required about 30 to 35 minutes, the batch was removed from the mill and allowed to stand for about 24 hours at room temperature. The batch was then replaced on the mill and vigorously reworked for about 10 to 15 minutes, at the end of which time it was removed as a sheet of about 0.1 inch in thickness. Because the acid reagent cannot be extracted by water after this milling operation, it appears that some kind of reaction has already occurred. This partially explains why the interruption of the milling may have the effect hereinbefore described.

After standing overnight, the remilled sheet was cut into 6 inch by 6 inch slabs, which were dusted with talc, placed in a vacuum oven, and heated for about 85 minutes at a temperature of 338° F. and a vacuum of about 28 inches of mercury. This completed the cyclizing operation. The reaction product had a somewhat elastic, leathery consistency, but its exact chemical composition has not been determined.

After standing for about three hours, the cyclized rubber derivative produced as described above was compounded on a rubber mill with modifying agents according to the following recipe:

|  | Parts by wt. |
|---|---|
| Rubber derivative | 100 |
| "Neozone D" antioxidant[1] | 2 |
| Magnesium oxide | 20 |
| "P-33" carbon black[2] | 10 |
| "Sulfasan R"[3] | 60 |
| Litharge | 30 |

[1] Phenyl-beta-naphthylamine of E. I. du Pont de Nemours & Co., Inc., Rubber Chemicals Division, Wilmington, Delaware.
[2] Fine thermal black of R. T. Vanderbilt Co., Inc., New York, N.Y.
[3] 4,4′ dithio-dimorpholine of Monsanto Chemical Co., St. Louis, Missouri.

The magnesium oxide was added first, followed by addition of the other ingredients together.

The Sulfasan is a source of sulfur which acts as a vulcanizing agent. Other vulcanizing agents which may be used for this purpose are elemental sulfur, tetramethyl thiuram disulfide, selenium, tellurium and mixtures thereof. These agents stiffen the adhesives in the vulcanized bond, rendering it less thermoplastic and, therefore, stronger at elevated temperature.

The litharge serves as an accelerator or activator of vulcanization and improves adhesion to a greater extent than other activators. The amount used may vary from 10 to 40 parts per 100 parts of rubber derivative, by weight.

During the mixing of the above compounding agents, the temperature was kept as low as possible by circulating tap water through the mill rolls, though, in this operation, the temperature is not particularly critical. Mixing time was about 30 minutes. The time of this mixing affects the viscosity of the resulting cement in inverse ratio to a degree depending somewhat on the size of the batch, as would be expected. The period of mixing required to give the desired final viscosity can only be determined experimentally for the particular mixing equipment, mixing technique, and batch size employed and should be increased somewhat if the batch size is increased. This last mixing operation was followed by a masticating operation to increase solubility in rubber solvents, after which the batch was dissolved in a solvent mixture according to the following recipe:

|  | Parts by wt. |
|---|---|
| Compounded rubber | 30 |
| Gasoline | 100 |
| Butyl alcohol | 10 |

The gasoline employed in the above recipe had a specific gravity of about 0.7, an initial boiling point around 114° F., and a final boiling point around 260° F.

To demonstrate the adhesive quality of the above described product, cylindrical rubber specimens were prepared and parallel steel discs were bonded to each end thereof with the above cement. The bond strength was tested under tension in accordance with method A of A.S.T.M. specification D429-47T. The steel discs had 2 square inch bonding areas, and the adhesive was applied thereto with one brush coat only, using no tie cement. The rubber cylinders to which the discs were cemented had a Shore hardness of 50 and were compounded from the following formula:

| | Parts by wt. |
|---|---|
| Smoked sheet | 100 |
| "Neozone D" antioxidant | 1 |
| Zinc oxide | 5 |
| Stearic acid | 3 |
| "P-33" carbon black | 55 |
| Pine tar | 2 |
| Mercaptobenzothiazole | 0.6 |
| Sulfur | 3 |

Cure: 20 minutes at 310° F.

When repeatedly tested as described, the force necessary to break the bond varied between the very narrow limits of 1000 pounds and 1200 pounds.

This cement made from either natural or synthetic rubber may be used to bond both natural and synthetic rubber compounds to a wide variety of metals.

The following are examples of synthetic rubber compounds which have been bonded successfully to steel, bond tests being conducted as above:

A

| | Parts by wt. |
|---|---|
| GR–S (standard) | 100 |
| Zinc oxide | 5 |
| EPC black | 50 |
| Sulphur | 2 |
| Altax | 1.5 |

Strength of bond at 212° F. was 420 pounds.
Strength of bond at room temperature was 1800 pounds.

B

| | |
|---|---|
| Neoprene GN | 100 |
| Magnesium oxide | 4 |
| Altax | .8 |
| Stearic acid | .5 |
| EPC black | 50 |
| PBNA | 2 |
| Zinc oxide | 5 |
| Light process oil | 5 |

Strength of bond at 212° F. was 650 pounds.
Strength of bond at room temperature was 1160 pounds.

This cement is stable in the can, showing no appreciable change in viscosity or bonding strength over a period of six months. It has good building tack and the heat resistance of a vulcanizing cement.

As previously mentioned, we have found that hard rubber dust, or ebonite, which contains a high percentage of sulfur in chemical combination with rubber, can be used in the cement formulation to reduce the thermoplasticity of the adhesive film for securing improved hot bond strengths. The hard rubber, or ebonite, when ground to a fine powder, apparently contains sulfur at the surface of the particles which is available for reaction with the rubber derivative in the adhesives.

The preferred hard rubber dust formula is one which contains nothing but natural rubber and sulfur, an illustrative combination being 68 parts of natural rubber to 32 parts of sulfur by weight, though this example is subject to wide variation. The preferred particle size of the rubber dust is such that all of it will pass through a Tyler 32-mesh sieve (32 mesh per inch) but none of it will pass through a Tyler 80-mesh sieve. The corresponding particle size range is from about 500 microns to 177 microns.

A still further improvement in the process has been achieved through the use of a small proportion of Neoprene with the natural rubber of the cement formulation, preferably before the vacuum oven reaction, though the Neoprene may be added to the cyclized rubber derivative on the rubber mill after the vacuum oven reaction, or may be added to the solvent during the preparation of the adhesive cement.

The following examples illustrate the use of Neoprene in making rubber derivatives and also the use of hard rubber dust in the formulation for the adhesive cement:

*Example II*

Using the same liquid mixture of acid reagents and the same procedure as in Example I, two additional adhesives were prepared. In one, all of the same ingredients employed in Example I prior to the vacuum oven treatment were mixed with the smoked sheet, and in the other, a small amount of Neoprene was added, with minor adjustments of the amounts of compounding agents. The comparative recipes were as follows:

| | Parts by Wt. | |
|---|---|---|
| | Mix B | Mix C |
| Smoked sheet | 100 | 100 |
| Neoprene C.G.[1] | | 13.6 |
| Phosphorous pentoxide | 2.9 | 3.9 |
| 2,2′ benzothiazyl disulfide | 0.8 | 0.9 |
| Acid reagent | 6.5 | 8.7 |
| Lignin | 8.0 | 9.1 |

[1] Polychloroprene of E. I. du Pont de Nemours & Co., Inc., Rubber Chemical Division, Wilmington, Delaware.

The compounding ingredients employed following the vacuum oven treatment were the same as in Example I except for the elimination of the "Sulfasan R," the addition of zinc oxide to modify the activation effect of litharge, and the use of different amount of hard rubber dust, as follows:

| | Parts by Wt. | |
|---|---|---|
| | Mix B | Mix C |
| Zinc oxide | 25 | 25 |
| Hard rubber dust | 60 | 45 |

When preparing the final adhesive, the same solvent mixture was used as in Example I, but larger quantities of rubber derivative were used to obtain the same viscosity and maintain essentially the same brushing consistency. Compared to 30 parts of rubber derivative in Example I, 45 parts of the final Mix B and 50 parts of the final Mix C were used respectively in the same amount of solvent.

When tested for bond strength at 212° F., the pull for both adhesives made from Mixes B and C reached 400 pounds before the bond failed.

Throughout this specification, and in the claims, the term "rubber" refers to natural rubber unless the contrary appears from the context. While natural rubber is the principal elastomeric material which is cyclized in accordance with the invention, a relatively small amount of polychloroprene may be incorporated as a modifying elastomer as explained above and is not intended to be excluded from the scope of the invention as defined in the claims.

From the foregoing description of this invention and from the illustrative examples of its use, it will be seen that the invention involves several features of novelty which contribute important properties to the final product and which, in combination, accomplish the various objectives of the invention in a single improved product for the purposes mentioned. While specific formulations have been given in the Examples for illustrative purposes, it will be appreciated by those skilled in the art that numerous changes therein may be made without departing from the true scope of the invention as defined in the appended claims.

Having described our invention, we claim:

1. In the process of preparing rubber derivatives suitable for use in solution as rubber to metal adhesives, wherein a weakly acid substance and a strong mineral acid are mixed into the rubber and the mixture is then subjected to an elevated temperature of effect a rubber cyclizing reaction, the improvement comprising mixing the strong mineral acid into the rubber as a liquid aqueous solution together with alkali-soluble, acid-insoluble, solid lignin as an acid carrier in which said liquid acid solution is absorbed to reduce spurting and evaporation of said solution while it is being mixed into the rubber.

2. In the process of preparing rubber derivatives suitable for use in solution as rubber to metal adhesives, wherein phosphorous pentoxide as a weakly acid substance and a mixture of aqueous sulfuric and hydrochloric acids as a strong mineral acid are mixed into the rubber and the mixture is then subjected to an elevated temperature to effect a rubber cyclizing reaction, the improvement comprising mixing the strong mineral acid into the rubber as a liquid aqueous solution together with alkali-soluble, acid-insoluble, solid lignin as an acid carrier in which said liquid acid solution is absorbed to reduce spurting and evaporation of said solution while it is being mixed into the rubber, the mixing of acidic reagents into the rubber being performed on rolls of a rubber mill while maintaining the rolls in the range of 80° to 100° F., and the mixing being continued under those conditions until the acidic reagents are thoroughly dispersed in the rubber.

3. In the process of preparing rubber derivatives suitable for use in solution as rubber to metal adhesives, wherein phosphorous pentoxide as a weakly acid substance and a mixture of aqueous sulfuric and hydrochloric acids as a strong mineral acid are mixed into the rubber and the mixture is then subjected to an elevated temperature to effect a rubber cyclizing reaction, the improvement comprising mixing the strong mineral acid into the rubber as a liquid aqueous solution together with alkali-soluble, acid-insoluble, solid lignin as an acid carrier in which said liquid acid solution is absorbed to reduce spurting and evaporation of said solution while it is being mixed into the rubber, the mixing of acidic reagents into the rubber being performed on rolls of a rubber mill while maintaining the rolls in the range of 80° to 100° F., and the mixing being continued under those conditions until the acidic reagents are thoroughly dispersed in the rubber, the mixture then being allowed to stand undisturbed at room temperature for an interval of about 6 to 36 hours followed by further mixing and sheeting to a desired thickness prior to being subjected to said elevated temperature to complete the cyclizing reaction.

4. The process of claim 2 in which the acid in the strong mineral acid solution consists essentially of sulfuric and hydrochloric acids in a ratio equivalent to about 5.25 parts of sulfuric acid of about 1.84 specific gravity to 1 part of hydrochloric acid of about 1.19 specific gravity.

References Cited in the file of this patent

UNITED STATES PATENTS

| | | |
|---|---|---|
| 310,560 | Conger | Jan. 13, 1885 |
| 1,579,493 | Shaffer | Apr. 6, 1926 |
| 1,609,644 | Darling | Dec. 7, 1926 |
| 1,731,484 | Geer | Oct. 15, 1929 |
| 1,744,880 | Geer | Jan. 28, 1930 |
| 2,143,544 | Crawford | Jan. 10, 1939 |
| 2,379,939 | Vance et al. | July 10, 1945 |
| 2,390,961 | Sanderson | Dec. 11, 1945 |
| 2,608,537 | Pollak | Aug. 26, 1952 |
| 2,760,943 | Sohn et al. | Aug. 28, 1956 |
| 2,857,345 | Griffith et al. | Oct. 21, 1958 |